Aug. 31, 1965  D. G. SMITH  3,203,726
CARGO HOIST APPARATUS
Filed Jan. 7, 1963  2 Sheets-Sheet 1

INVENTOR.
DONALD G. SMITH
BY
*George C. Sullivan*
Agent

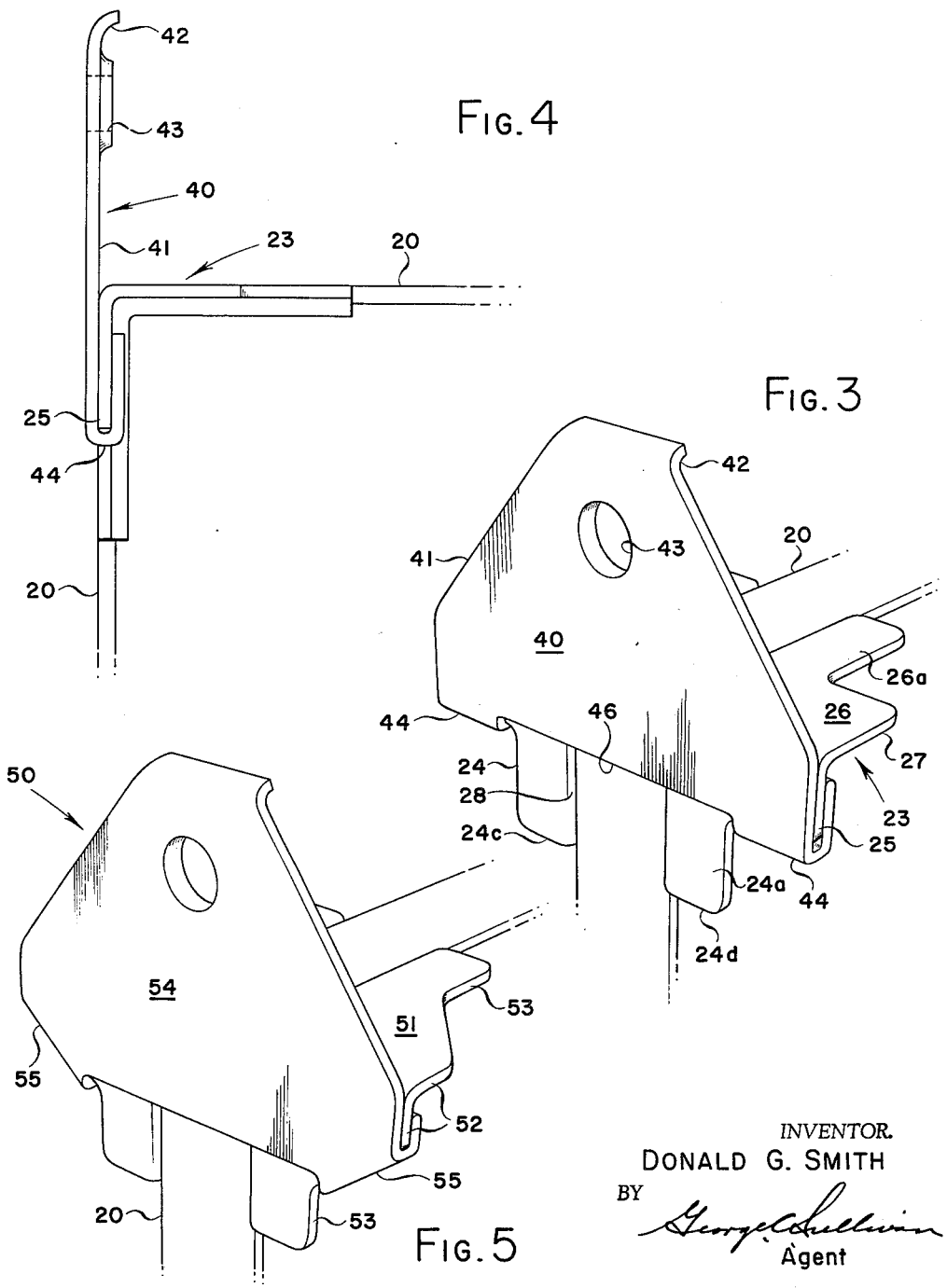

United States Patent Office 3,203,726
Patented Aug. 31, 1965

3,203,726
CARGO HOIST APPARATUS
Donald G. Smith, Marietta, Ga., assignor to Lockheed
Aircraft Corporation, Burbank, Calif.
Filed Jan. 7, 1963, Ser. No. 249,889
4 Claims. (Cl. 294—74)

This invention relates to apparatus for handling cargo, and more particularly to a cargo hoist apparatus adapted to permit the handling of cargo by its strapping.

To facilitate the transportation of cargo, it has been found most economical to unitize the cargo into cargo units or packages. One method of cargo packaging which has found widespread use is that of packaging cargo into a container which may be fiberboard, for example. When large packages of this type are formed, it has been found desirable and necessary to reinforce and make rigid the package by the use of wire bands in a manner more particularly disclosed in the U.S. Patent 1,970,781 to Stevens et al., patented August 21, 1934, and the U.S. Patent 2,004,-626 to Hann, patented June 11, 1935. One of the principal problems experienced in the use of large cargo packages is that of moving the package to and from storage or the carrier. This problem has been solved in accordance with this invention in a unique manner by providing corner hoist fittings of low profile which cooperate with the cargo strapping to permit the lifting of the cargo while using the cargo strapping as a sling. The hoist fittings are uniquely constructed such that a complementary hoisting element may be slidingly engaged therewith without lifting, turning, or otherwise moving the cargo package. Also, as the hoist fittings have a low profile, they permit a maximum utilization of space in the storage area or the carrier into which the cargo is loaded. In addition, the hoist fittings, being of simple construction, are extremely economical to manufacture.

Accordingly, it is an object of this invention to provide cargo hoist apparatus of simple construction for cooperating engagement with cargo strapping whereby cargo may be lifted by its strapping.

Another object of this invention is to provide a cargo hoist fitting cooperating with cargo strapping constructed and arranged such that a cargo hoist element may be slidingly engaged therewith for lifting cargo by its strapping.

Other objects and advantages will become apparent from the following description taken in connection with the accompanying drawings in which:

FIGURE 3 is an enlarged view of a hoist element engaged with the cargo hoist fitting of FIGURE 2;

FIGURE 4 is a side view of the cargo hoist fitting shown in FIGURE 3; and

FIGURE 5 is another embodiment of the cargo hoist apparatus of FIGURES 3 and 4.

Generally stated, cargo movement and handling is facilitated in accordance with this invention by lifting the cargo by its strapping. Toward this end, cargo hoist fittings are interposed between certain of the cargo straps and the corners of the cargo package and are constructed such that complementary hoist elements may be slidingly engaged therewith whereby the cargo package may be hoisted using the strapping as a sling.

Figure 1:
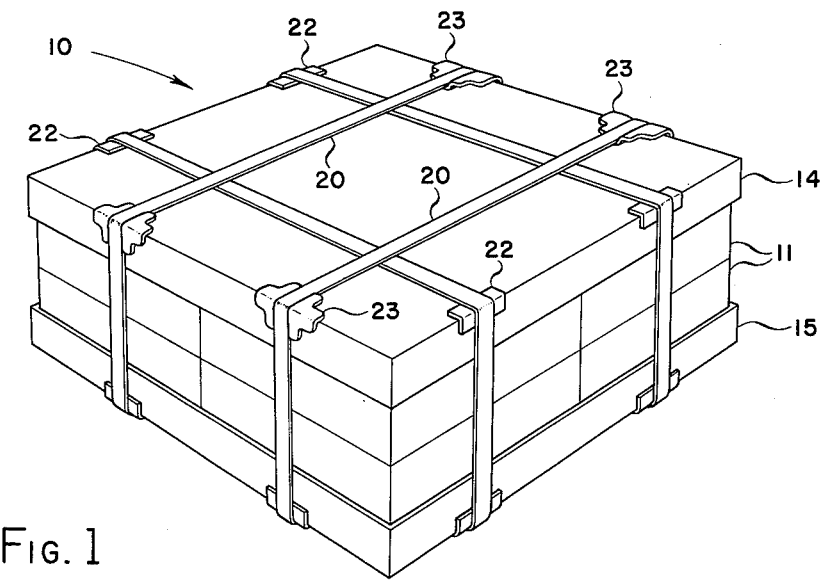
FIGURE 1 is a pictorial view of a container provided with cargo hoist fittings in accordance with one embodiment of this invention.

More specifically, there is shown in FIGURE 1 a unitized cargo package 10 comprising cargo unit 11 encased in fiberboard end caps 14 and 15, which cover the tops and bottoms of the cargo units and provide dimensional limits in length and width for the cargo units stacked within their confines. To reinforce and make rigid the cargo package 10, the transverse and lengthwise cargo straps 20 are wrapped about the package 10 and are secured in place slightly in tension. To prevent the straps from biting into the corners of the cargo package 10, the rigid corner angles 22 and the hoist fittings 23 are interposed between the cargo straps and the corners of the caps 14 and 15. The corner angles 22 and hoist fittings 23 additionally perform the important function of absorbing and distributing impact loads encountered in the handling of the cargo package 10.

Figure 2:
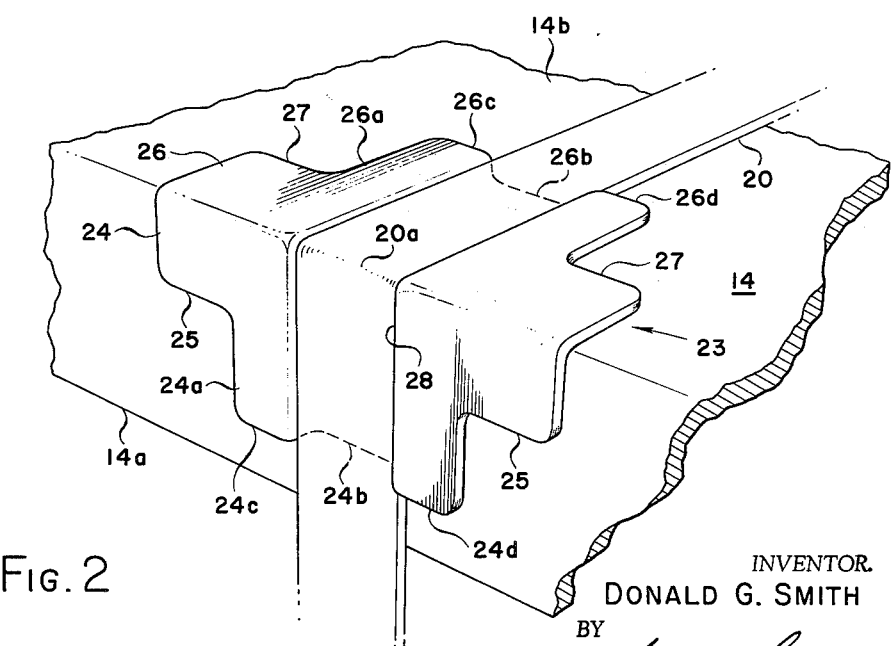
FIGURE 2 is an enlarged view of the cargo hoist fitting embodiment of FIGURE 1.

The hoist fittings 23, as shown in detail in FIGURE 2, are of unique construction to make possible the lifting of the cargo package 10 by the straps 20. Each hoist fitting 23 is substantially cross-shaped when laid out in plan and is bent along a transverse central axis to form T-shaped legs 24 and 26. The stems 24a and 26a of the T-shaped legs 24 and 26, respectively, have their central portions 24b and 26b longitudinal their length offset with respect to their respective flanking stem portions 24c, 24d and 26c, 26d to form the continuous groove 28 longitudinally of the legs 24 and 26. Additionally, heads 25 and 27 of legs 24 and 26, respectively, are offset with respect to the groove 28 and may properly be called hoist flanges. In their installed position, the hoist fittings 23 are disposed on the corners of at least one side of the cargo package 10 and the cargo straps 20 are strapped around the cargo package 10 with the corners 20a of the cargo straps 20 guidably received in the grooves 28 of the hoist fittings 23. For example, when the hoist fitting 23, FIGURE 2, is emplaced on end cap 14, the flanges 24c, 24d and 26c, 26d are disposed in spaced apart relation from the side wall 14a and the top 14b of the cargo package end cap 14, and the central portions 24b and 26b of the stems 24a and 26a are in snug engagement with the side wall 14a and top 14b of the end cap 14. Also, the hoist flanges 25 and 27 are disposed in spaced apart relation from the side wall and top of end cap 14.

There is provided a hoist element 40, shown in FIGURES 3 and 4, for cooperating engagement with the hoist flanges 25 or 27 of the hoist fittings 23 for hoisting the cargo package 10. Each hoist element 40 is platelike and has a truncated triangular lifting portion 41 which is slightly curvilinearly bent over at the top 42 thereof and is provided with a through hole 43. The wide bottom of the lifting portion 41 is bifurcated and bent along a transverse axis to form lifting U-shaped flanges 44 separated by the opening or cutout 46 therebetween, which opening is slightly wider than the stems 24a and 26a of the hoist fittings 23.

In operation, cables are connected to any appropriate number of hoist elements 40 by connection to the through holes 43. The lifting flanges 44 of the hoist elements 40 are then slidingly matingly engaged with the hoist flanges 25 or 27 of related hoist fittings 23 disposed on one side of the cargo package 10 with the stem 24a or 26a of the hoist fitting extending through the central opening 46 of the hoist element such that the terminal ends of the hoist flanges 25 or 27 are cradled by and seated in the lifting flanges 44. Upon the application of a lifting force to the cables, the hoist elements 40 react with the hoist fittings 23 and the hoist fittings react with the cargo straps 20 such that the cargo package 10 is elevated using the cargo straps as slings. It will be appreciated that a spreader bar may be used to separate the cables and position them substantially above the hoist elements 40. A hoist fitting 23 may be placed under each of the corners of straps 20 to permit pickup of the cargo package from any strap corner arrangement.

There is shown in FIGURE 5 another embodiment of the cargo hoist apparatus of this invention. The cargo hoist apparatus 50 therein shown comprises a cargo hoist fitting 51, the hoist flanges 52 of which are inclined at an angle less than 90 degrees with respect to the stem portion 53 thereof and a cargo hoist element 54 having lifting flanges 55 angularly inclined for complementary engagement with the hoist flanges 52 of the hoist fitting 51 for lifting a cargo package by its strapping. In the cargo hoist apparatus 50, the inclination of the hoist flanges 52 and the complementary lifting flanges 55 provides a larger surface area of contact therebetween than is provided between the corresponding flanges of the cargo hoist apparatus 10 of FIGURE 1; thus, the possibility of the crushing of the flanges under heavy loading is reduced. This construction further directs the reactive forces caused by lifting with a cable toward the center of the cargo hoist apparatus 50. In all other respects the cargo hoist apparatus 50 is identical to the cargo hoist apparatus 10 and its other constructional details will not therefore be described in detail.

It will be seen from the above that this invention provides a simple and time-saving apparatus for lifting cargo by its strapping and that the cargo hoist apparatus making this possible is of simple construction and is easy to use. Further, the cargo hoist fittings of the cargo hoist apparatus are economical of manufacture and, as a consequence, may be used to replace conventional container corner angles without a prohibitive cost penalty, thus making it possible to lift any container by its strapping from any at rest position.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:
1. In combination:
a cargo package;
at least one cargo strap securely mounted around said cargo package;
and a hoist fitting interposed between said cargo strap and said cargo package on opposed corners of at least one side of said cargo package,
   each of said hoist fittings having a pair of portions angulated relative to each other,
   each portion having an elongate central area in a first plane for each portion,
   the areas of each portion on the opposite edges of each central area being located in a second plane for each portion, said second plane above and parallel to said first plane,
   one side of said central area of each portion in contact with the surface of the cargo package when mounted thereto by the secured strap,
   the areas of each portion lying in said second plane being spaced from the surface of the cargo package and adapted to be slideably engaged by a hoist element connected to a hoisting line to permit the cargo strapping to serve as the cargo hoisting sling.
2. An article of manufacture comprising:
a flat, cross-shaped plate member bent along a transverse central axis to form a pair of T-shaped angularly related legs,
   each of said legs having a head and a stem, the end portions of each said leg head being offset planarly relative to at least the central longitudinal portion of the leg,
   and the offset head portions of each leg being in the same plane, parallel to and above the plane of said central longitudinal portion of the leg.
3. An article of manufacture comprising:
a flat, cross-shaped plate member bent along a transverse central axis to form a pair of T-shaped angularly related legs,
   each of said legs having a head and a stem,
   the central portion of each of said legs extending longitudinally from the bottom of the stem to the top of the head offset relative to the rest of the leg,
   said offset portion of each leg located in a plane removed from, parallel to and above the plane of the rest of the leg,
   and the offset portions of the legs forming a two planar portion channel,
      said channel portions angularly related the same as the angular relationship between the legs.
4. A cargo hoist apparatus for lifting a securely strapped cargo package by its strapping comprising in combination:
at least two hoist fittings each capable of interposition between a corner of the cargo package and the cargo package strapping, each hoist fitting having a pair of angularly related legs with at least one of said legs being T-shaped with a head and a stem, the end portions of said leg head being offset planarly to at least the central longitudinal portion of said leg, both offset head portions of said leg being in the same plane, parallel to and above the plane of the central longitudinal portion of said leg;
and a hoist element means for each hoist fitting, each hoist element having a pair of spaced apart U-shaped lifting flange means for free, slidably removable engagement with one of said offset head portions of said hoist fitting, said spacing of the hoist element lifting flange means corresponding to the spacing of the offset head portions of said hoist fitting for permitting the cargo strapping to serve as a cargo hoisting sling upon engagement of said hoist fittings with said hoist elements and connection of hoisting lines to said hoist elements.

References Cited by the Examiner

UNITED STATES PATENTS

| 398,546 | 2/89 | Shoemaker | 217—69 |
| 2,049,684 | 8/36 | Bongiovanni et al. | 248—300 |
| 2,192,131 | 2/40 | Fishwick | 224—45 |
| 2,198,244 | 4/40 | Chapman | 224—45 |
| 3,106,348 | 10/63 | Robinson | 248—224 X |

FOREIGN PATENTS

| 200,450 | 11/55 | Australia. |
| 185,955 | 6/56 | Austria. |

ROBERT B. REEVES, *Acting Primary Examiner.*

ANDRES H. NIELSEN, SAMUEL F. COLEMAN,
*Examiners.*